United States Patent
Ben-Zvi et al.

(10) Patent No.: US 12,540,537 B2
(45) Date of Patent: Feb. 3, 2026

(54) IRON OXIDE FOR IN-SITU OIL UPGRADING VIA DEASPHALTING

(71) Applicant: CENOVUS ENERGY INC., Calgary (CA)

(72) Inventors: Amos Ben-Zvi, Calgary (CA); Nashaat Nassar, Calgary (CA); Paulina Morasse, Calgary (CA); Lukemon Adetunji, Calgary (CA)

(73) Assignee: CENOVUS ENERGY INC., Calgary (CA)

( * ) Notice: Subject to any disclaimer, the term of this patent is extended or adjusted under 35 U.S.C. 154(b) by 136 days.

(21) Appl. No.: 18/624,813

(22) Filed: Apr. 2, 2024

(65) Prior Publication Data

US 2024/0344437 A1 Oct. 17, 2024

Related U.S. Application Data

(60) Provisional application No. 63/495,600, filed on Apr. 12, 2023.

(51) Int. Cl.
 *E21B 43/24* (2006.01)
(52) U.S. Cl.
 CPC .................. *E21B 43/2408* (2013.01)
(58) Field of Classification Search
 CPC ........ E21B 43/2408; E21B 43/34; C09K 8/34
 USPC ......................................................... 166/268
 See application file for complete search history.

(56) References Cited

U.S. PATENT DOCUMENTS

| | | |
|---|---|---|
| 2010/0012331 A1 | 1/2010 | Larter et al. |
| 2013/0334097 A1 | 12/2013 | Patino et al. |
| 2014/0187449 A1* | 7/2014 | Khabashesku ......... C09K 8/524 507/90 |
| 2015/0114635 A1 | 4/2015 | Ovalles et al. |
| 2016/0177691 A1* | 6/2016 | Benson ............... E21B 43/2406 166/272.3 |
| 2016/0369158 A1 | 12/2016 | Edgar |
| 2017/0058186 A1* | 3/2017 | Oghena .................. C09K 8/592 |
| 2017/0328187 A1* | 11/2017 | Patiño .................... C10G 11/04 |
| 2023/0417129 A1 | 12/2023 | Ben-Zvi et al. |

OTHER PUBLICATIONS

Nassar et al., "Removal of asphaltenes from heavy oil by nickel nano and micro particle adsorbents", Proceedings of the IASTED International Conference Sep. 29-Oct. 1, 2008 Crete, Greece, Nanotechnology and Applications (NANA 2008) Conference Paper, Available online at: <https://www.researchgate.net/publication/275581893>Sep. 2008, pp. 171-175.

\* cited by examiner

*Primary Examiner* — William D Hutton, Jr.
*Assistant Examiner* — Ashish K Varma
(74) *Attorney, Agent, or Firm* — ArentFox Schiff LLP

(57) ABSTRACT

A method for producing hydrocarbons from a subterranean reservoir, the method comprising the steps of: injecting steam into the subterranean reservoir; making at least two injections of an iron oxide asphaltene-sorbent, with each injection separated in time from the one prior; allowing residence time for the iron oxide asphaltene-sorbent in the subterranean reservoir, thereby producing upgraded hydrocarbons and asphaltenes adsorbed to the iron oxide asphaltene-sorbent in the subterranean reservoir; and producing the upgraded hydrocarbons, without producing the asphaltenes that are adsorbed to the iron oxide asphaltene-sorbent.

20 Claims, 7 Drawing Sheets

Legend
- Hydrocarbon molecule ●
- Asphaltene molecule ○
- Asphaltene sorbent particle ◉
- Steam
- Carrier fluid

IRON OXIDE FOR IN-SITU OIL UPGRADING VIA DEASPHALTING

CROSS-REFERENCE TO RELATED APPLICATION(S)

This Application claims priority of U.S. Provisional Application No. 63/495,600 entitled "IRON OXIDE FOR IN-SITU OIL UPGRADING VIA DEASPHALTING", filed on Apr. 12, 2023, the disclosure of which is expressly incorporated by reference herein in its entirety.

FIELD OF THE INVENTION

The present invention relates to production of hydrocarbons from a subterranean reservoir using steam injection to enhance production, such as in a SAGD well system, and more particularly to use of iron oxide particles, which may be a nanoparticles, to adsorb asphaltenes in the subterranean reservoir to upgrade the hydrocarbons in-situ in the subterranean reservoir.

BACKGROUND OF THE INVENTION

In-Situ Hydrocarbon Production.

Hydrocarbons can be produced from a subterranean reservoir by hot water or steam (collectively referred to as steam) injection to the reservoir. This is called in-situ hydrocarbon production. In general, steam injection is a technique for enhancing production of hydrocarbons from a subterranean reservoir to the surface by injecting steam into a reservoir to reduce the viscosity of hydrocarbons in the reservoir, so that the hydrocarbons flow more readily to a producing well.

Steam assisted gravity drainage (SAGD) is an example of steam injection that involves injecting steam from the surface into an upper horizontal well (an injection well) disposed in the reservoir above a lower horizontal well (a production well). The injected steam exits the injection well and rises in the reservoir to form a steam-saturated zone, which is conceptualized as a "steam chamber", where hydrocarbons are heated by the steam and thereby reduced in viscosity. The reduced-viscosity hydrocarbons drain, for example downward by gravity, into the production well, and are produced to the surface.

Asphaltenes in Produced Hydrocarbons.

Hydrocarbons produced by steam injection may be heavy oils. Generally, heavy oil has a high asphaltene content. Asphaltenes are complex polar aromatic and high macromolecules. Generally, asphaltenes are defined as the propane, n-butane, n-pentane or n-heptane insoluble and benzene/toluene soluble fraction of crude oil including heavy oil.

Asphaltenes create problems during production and handling of heavy oil. The viscosity of heavy oil is quite high and equipment fouling can occur due to the presence of asphaltenes in the oil.

Generally, upgrading is required to remove the asphaltenes. If heavy oil could be reliably upgraded in-situ, before being produced to surface, this would offer a significant benefit to producers.

SUMMARY OF THE INVENTION

In one aspect, the present invention comprises a method for producing hydrocarbons from a subterranean reservoir. In particular, a broad aspect of the invention is directed to a method for producing hydrocarbons from a subterranean reservoir, the method comprising the steps of: injecting a first amount of iron oxide particles as an asphaltene-sorbent into the subterranean reservoir; allowing time for the iron oxide particles to adsorb asphaltenes from the hydrocarbons; injecting a second amount of iron oxide particles as an asphaltene-sorbent into the subterranean reservoir, thereby causing asphaltenes to become adsorbed to the iron oxide particles in the subterranean reservoir; and producing upgraded hydrocarbons, without producing the asphaltenes adsorbed to the iron oxide particles.

According to one broad aspect, there is provided a method for producing hydrocarbons from a subterranean reservoir, the method comprising the steps of (a) injecting a first amount of iron oxide particles as an asphaltene-sorbent into the subterranean reservoir;

(b) allowing time for at least some of the iron oxide particles to adsorb asphaltenes from the hydrocarbons;

(c) injecting a second amount of iron oxide particles as an asphaltene-sorbent into the subterranean reservoir, wherein steps (a) to (c) result in asphaltenes being adsorbed to the iron oxide particles in the subterranean reservoir and thereby generating upgraded hydrocarbons within the subterranean reservoir; and (d) producing the upgraded hydrocarbons.

BRIEF DESCRIPTION OF THE DRAWINGS

In the drawings, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIG. 3A shows a subterranean reservoir in relation to an injection tubing and production tubing of a SAGD well system.

FIG. 3B shows injection of a carrier fluid mixed with asphaltene-sorbent particles into the subterranean reservoir via the production tubing.

FIG. 3C shows injection of steam mixed with asphaltene-sorbent particles into the subterranean reservoir via the injection tubing.

FIG. 3D shows asphaltene-sorbent particles attached to sand in the subterranean reservoir, and adsorbing asphaltene molecules in the subterranean reservoir.

FIG. 3E shows hydrocarbons draining by gravity into the production tubing, while the asphaltene-sorbent particles with adsorbed asphaltene remain attached to the subterranean reservoir.

FIG. 3F shows production of hydrocarbons to the surface via the production tubing string.

DETAILED DESCRIPTION OF EMBODIMENTS OF THE INVENTION

Definitions

Figure 1:
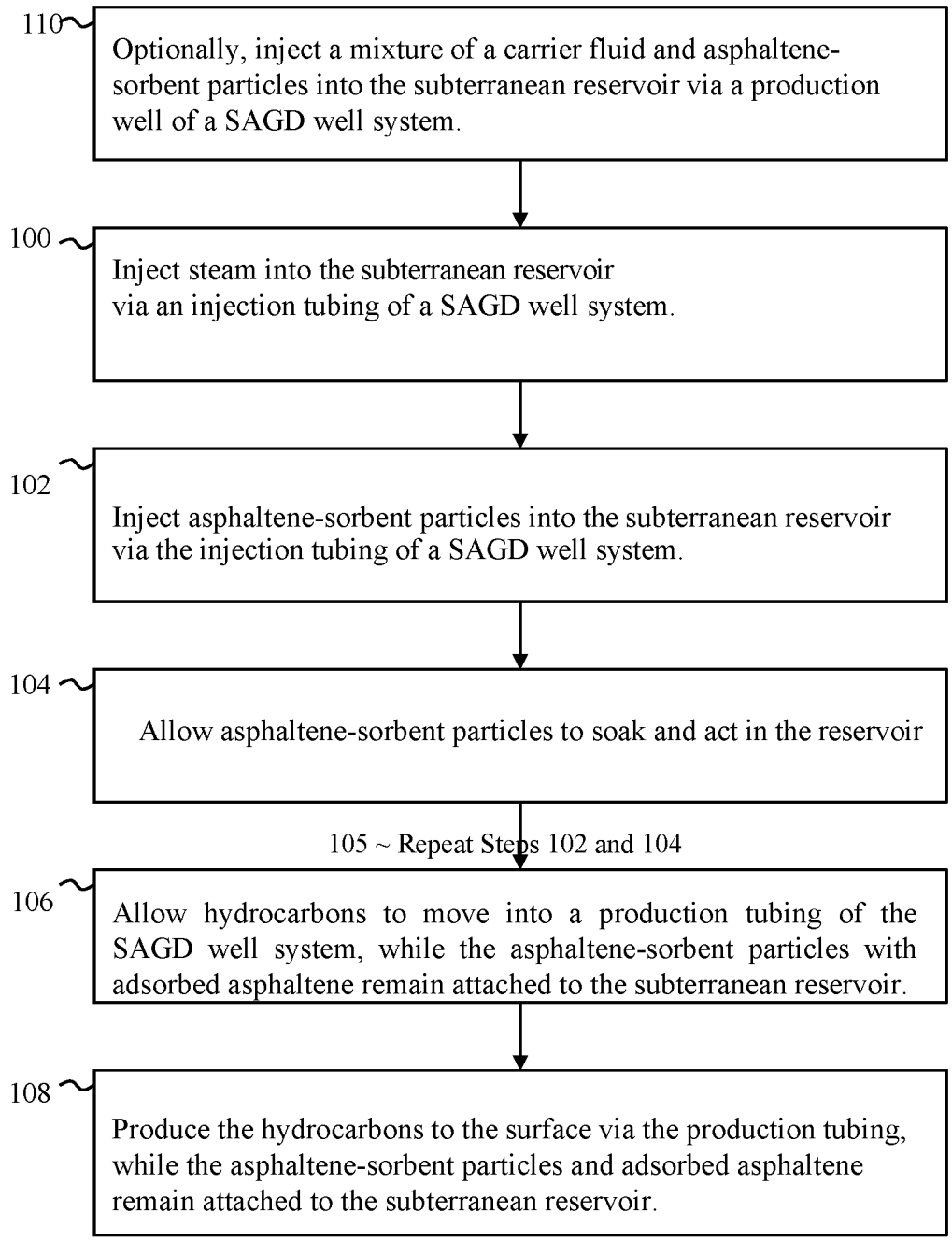
FIG. 1 is a flow chart of a first embodiment of a method of the present invention, for production of hydrocarbons from a subterranean reservoir using a steam assisted gravity drainage (SAGD) well system, and using asphaltene-sorbent particles to adsorb asphaltene in the subterranean reservoir.

The present invention relates to production of hydrocarbons from a subterranean reservoir with in-situ upgrading of the produced hydrocarbons using iron oxide as an asphaltene-sorbent particulate. Generally, production of hydrocarbons from a subterranean reservoir employs the injection of a fluid that facilitates production, the fluid being hot water, steam, solvent or gas (collectively referred to herein as steam).

Any term or expression not expressly defined herein shall have its commonly accepted definition understood by a person skilled in the art. As used herein, the following terms have the following meanings.

"Subterranean reservoir" refers to a subsurface body of rock having porosity and permeability that is sufficient to permit storage and transmission of a liquid or gaseous fluid.

"Steam chamber", in the context of a SAGD well system, refers to a region of a subterranean reservoir that is in fluid and pressure communication with an injection well and that is subject to depletion of hydrocarbons into a production well that is disposed below the injection well.

"In situ production" refers to any method of producing heavy hydrocarbons from a subterranean reservoir that involves injection of a fluid, such as heated water, steam, solvents, gas, herein collectively referred to as steam, into the subterranean reservoir to decrease the viscosity of the hydrocarbons, so that the hydrocarbons flow more easily in the subterranean reservoir. Producing or production means moving or allowing the hydrocarbons to move from a subterranean formation, into a well and ultimately to surface. Without limitation, in situ heavy oil/bitumen production operations include methods known in the art as steam assisted gravity drainage (SAGD), steam flooding, water flooding, steam drive, cyclic steam stimulation (CSS), solvent aided processes (SAP), solvent-dominant processes (SDP), cold heavy oil production with sand (CHOPS) or $CO_2$ flood.

"Hydrocarbons" refer to hydrocarbon substances naturally occurring in a subterranean reservoir. Hydrocarbons may be in liquid, gaseous, or solid phases. Without limitation, hydrocarbons may include "heavy oil", referring to hydrocarbons having a mass density of greater than about 900 kg/m$^3$ under natural reservoir conditions. Without limitation, hydrocarbons and heavy oil may also include "bitumen" having a mass density of greater than about 1,000 kg/m$^3$ under natural reservoir conditions, and existing in semi-solid or solid phase under natural reservoir conditions. It will be understood that "hydrocarbon production", "producing hydrocarbons" and like terms, as used herein, do not preclude co-production of non-hydrocarbon substances that may be mixed with hydrocarbons such as trace metals, water/brine, and gases such as hydrogen sulfide. The gases may be dissolved under natural reservoir conditions, but exist in a gaseous phase at surface conditions.

"Asphaltene" refers to the propane, n-butane, n-pentane or n-heptane insoluble and benzene/toluene soluble fraction of heavy oil. Asphaltenes are complex polar aromatic and high macromolecules.

"Asphaltene-sorbent particle" refers to iron oxide particles. Iron oxide particles have a high affinity for asphaltene at pressure and temperature conditions normally found in subterranean reservoirs, and relatively little to no affinity for valuable, non-asphaltene hydrocarbons in the subterranean reservoir under those conditions. This affinity may be based on principles of adsorption—i.e., the asphaltene-sorbent particle physically adheres and/or chemically bonds to asphaltene. Iron oxide is also environmentally acceptable and abundant. In embodiments, the iron oxide particle has a maximum dimension (e.g., a diameter) of 1000 nm. In one embodiment, the maximum dimension is 500 nm or more particularly less than 250 nm. In embodiments, the asphaltene-sorbent particle is a "nanoparticle", which as used herein, refers to a particle that has a maximum dimension less than 100 nm. In embodiments, a nanoparticle may have a maximum dimension less than 50 nm, and more particularly less than 25 nm.

"Upgraded hydrocarbons" are hydrocarbons that have been treated such that they have a reduced concentration of asphaltenes compared to the concentration of asphaltene in that hydrocarbon prior to treatment.

Method.

Figure 2:
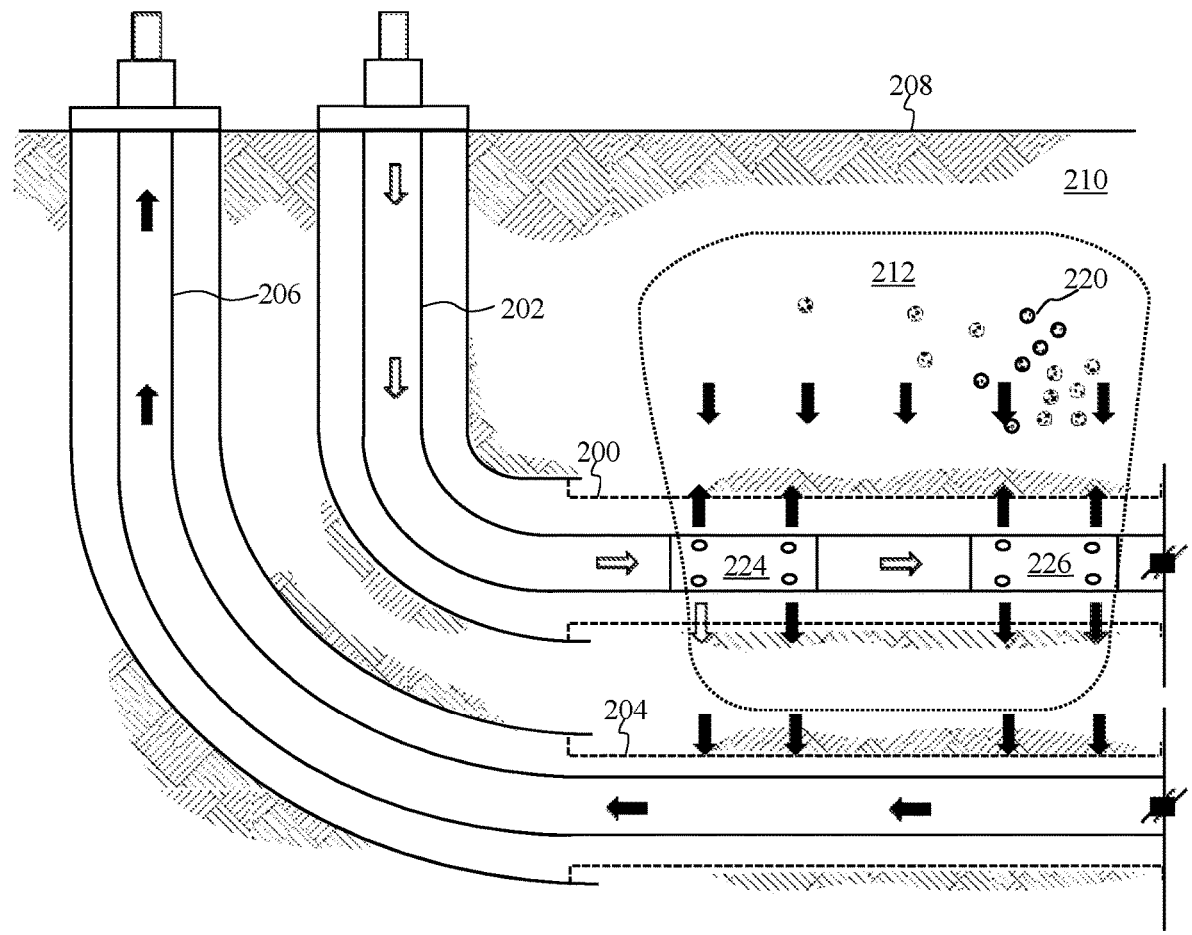
FIG. 2 is a schematic depiction of a SAGD well system that may be used in implementing the method of FIG. 1, along with asphaltene-sorbent particles attached to the subterranean reservoir.

FIG. 1 is a flow chart of a first embodiment of a method of the present invention, for production of hydrocarbons from a subterranean reservoir using a steam assisted gravity drainage (SAGD) well system, and using asphaltene-sorbent particles to adsorb asphaltene in the subterranean reservoir. By adsorption of the asphaltene, the hydrocarbons become upgraded in the reservoir, before they are produced to surface. Adsorption of the asphaltene improves the viscosity of the produced hydrocarbons and simplifies handling. While the SAGD is used to explain the invention, it is useful in other in situ oil production processes such as any of steam flooding, water flooding, steam drive, cyclic steam stimulation (CSS), solvent aided processes (SAP), solvent-dominant processes (SDP), CHOPS or $CO_2$ flood FIG. 2 is a schematic depiction of a SAGD well system that may be used in implementing the method of FIG. 1. SAGD well systems and their principles of operation are well known to persons skilled in the art. The following description is provided to facilitate understanding of the present invention. For simplicity of illustration, FIG. 2 omits various equipment items (e.g., steam generators, surface pumps, downhole pumps, sealing elements and so forth) that are commonly associated with a SAGD well system. The SAGD well system includes a horizontal or deviated (i.e. non-vertical) leg of an injection well 200 including an injection tubing 202, and a horizontal or deviated (i.e. non-vertical) leg of a production well 204 including a production tubing 206, extending from the surface 208 into a subterranean reservoir 210. The production well 204 is parallel to the injection well 200, and disposed below the injection well 200. A surface pump (not shown) is used to inject steam (as shown by hollow arrows) into the injection tubing 202, which exits through openings (e.g., a slots in a slotted liner) in the injection tubing 202. The steam then moves from the well 200 into the subterranean reservoir to create a steam-saturated zone referred to as a steam chamber 212. In the steam chamber 212, the injected steam heats the hydrocarbons and thereby reduces their viscosity. The reduced-viscosity hydrocarbons (as shown by solid arrows) drain downward by gravity through openings (e.g., a slotted liner) of the production well 204, and into the production tubing 206. The hydrocarbons are produced to the surface via the production tubing 206.

Figure 3A:
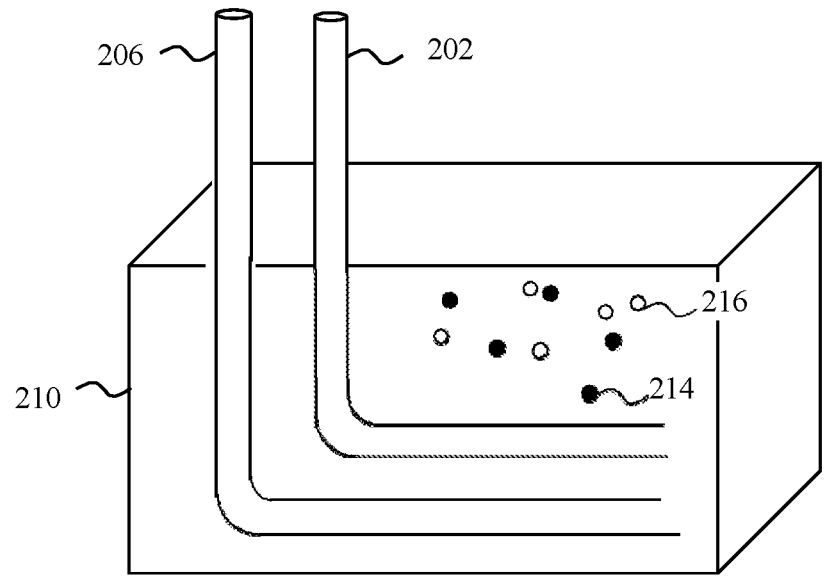
FIGS. 3A to 3F are schematic depictions of sequential stages of the method of FIG. 1.

FIG. 3A is a schematic depiction of the injection tubing 202 and production tubing 206 of a SAGD well system in a subterranean reservoir 210 before steam injection. The subterranean reservoir contains hydrocarbons, as shown by hydrocarbon molecules 214, and asphaltene, as shown by asphaltene molecules 216.

Figure 3B:
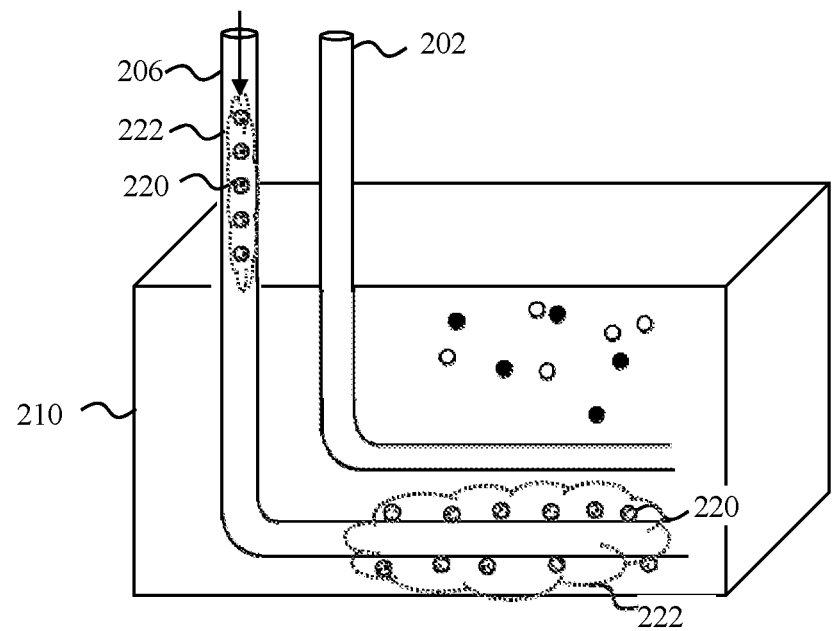
Figure 3C:
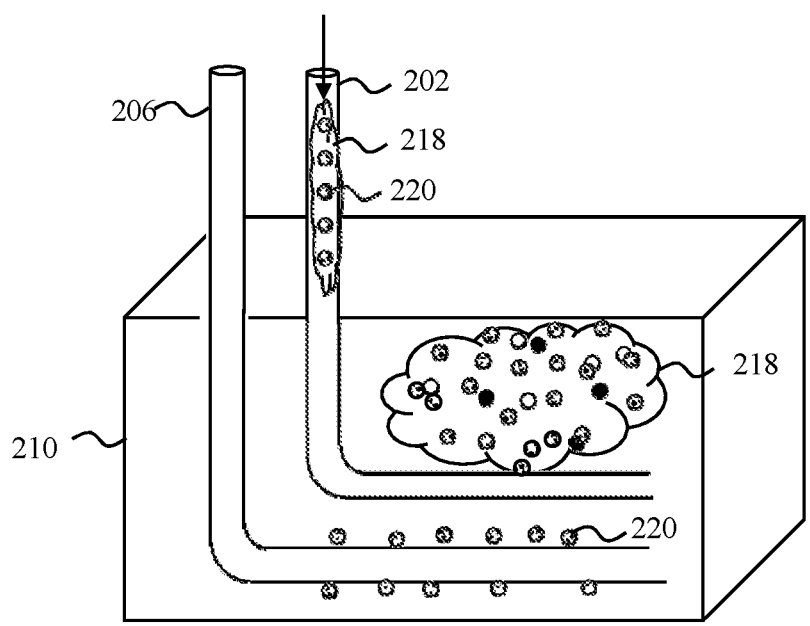

Referring back to FIG. 1, at steps 100 and 102, steam and iron oxide particles 220, herein sometimes referred to as asphaltene sorbent particles, are injected, via the injection tubing string 202, into the subterranean reservoir. The asphaltene-sorbent particles are injected in a SAGD operation sequentially before or after the steam is injected or as a mixture with the steam. FIG. 3C is schematic depiction of one embodiment of steps 100 and 102, showing steam 218 mixed with iron oxide particles 220 being pumped into the subterranean reservoir 210. The particles 220 can be suspended in the injected steam 218 even at relatively low flow velocities of the injected steam, because of their small size.

The iron oxide is injected in a carrier fluid. In one embodiment, the carrier fluid may be steam. Alternately or in addition, a different carrier fluid may be employed such as, for example, ethyl acetate, water, hydrocarbon or gases, such as a nitrogen or methane.

Iron oxide is capable of adsorbing asphaltene over the full range of temperatures expected to be encountered in the steam chamber of a SAGD well system, which typically ranges from about 15° C. to about 300° C. In particular embodiments, the iron oxide particles will be injected into steam chambers at temperatures of about 110° C. or greater, more particularly of about 200° C. or greater, and even more particularly, of about 230° C. or greater, to about 300° C. In one embodiment, the iron oxide is injected to a steam chamber that by injection of steam is operated at a temperature of 200 to 300° C. It has been found that iron oxide is effective for asphaltene removal at this range of temperatures including up to 300° C.

The method elevates the pressure in the steam chamber. In one embodiment, steam injection causes the subterranean reservoir to have a pressure of 500 kPa to 9 MPa. Generally, the method will be conducted to inject the steam and the iron oxide into a formation held at a pressure of between 2 to 5 MPa.

The iron oxide particles are sized so that they can permeate through the pores of the subterranean reservoir, without substantially impairing transmission of a liquid or gaseous fluid through the subterranean reservoir. A suitable size of asphaltene-sorbent particles may be selected having regard to the characteristics of a particular subterranean reservoir. As a non-limiting example, for subterranean reservoirs containing heavy oil in Alberta, Canada, a suitable maximum dimension (e.g., diameter) of asphaltene-sorbent particles may be less than about 1,000 nm, more particularly less than about 500 nm, and even more particularly less than about 250 nm. In some embodiments, the asphaltene-sorbent particles may be nanoparticles—i.e., particles having a maximum dimension (e.g., diameter) less than about 100 nm, more particularly less than about 50 nm, and even more particularly less than about 25 nm.

Use of asphaltene-sorbent particles having higher surface area per mass may increase their efficacy in adsorption of the asphaltene. In embodiments, the iron oxide particles are configured to have a surface area per mass in the range from about 1 to about 3,000 m$^2$/g. In some embodiments, the surface area per mass may be greater than 50 m$^2$/g, greater than about 100 m$^2$/g, greater than about 250 m$^2$/g, greater than about 500 m$^2$/g, greater than about 750 m$^2$/g, and greater than about 1,000 m$^2$/g.

Having regard to the asphaltene affinity of the selected asphaltene-sorbent particles, the concentration of asphaltene-sorbent particles introduced to the reservoir may be selected to be effective in adsorbing asphaltene present in concentrations in the hydrocarbons in the subterranean reservoir, which typically range from about 20 ppm to about 30,000 ppm and may range from 50 to 5,000 ppm. In one embodiment, the concentration of asphaltene-sorbent particles introduced to the formation is at least 10 ppm, the ppm measurement being calculated as a mixture with the total volume of carrier fluid injected with the sorbent particles in the reservoir. Generally, good results are obtained where the concentration of asphaltene-sorbent particles introduced to the formation is at least 50 ppm and less than 400 ppm or less than 300 ppm or less than 150 ppm. For example, the iron oxide may be injected at a concentration of 50 to 400 ppm in the volume of carrier fluid injected.

It is best to define the concentration of the sorbent in the carrier fluid, as opposed to a concentration in the formation. Concentration in the formation is based on a number of factors including for example the volume of the steam chamber used to do the calculations and is therefore meaningless. Further, the formation concentration can vary significantly. For example, there may be a very high concentration near a steam ingress point and a concentration of zero where steam bypassed a section of the formation.

After injection of the asphaltene-sorbent particles, the particles adsorb asphaltene and the particles with asphaltene adsorbed thereto remain in the formation while the valuable, hydrocarbons are produced from the reservoir with a reduced asphaltene content over the hydrocarbons that would be produced from that formation without treatment with iron oxide. While the invention is not intended to be bound by theory, it is believed that the asphaltene-sorbent particles become attached to the rock in the subterranean reservoir and the asphaltene adsorbs to the particles. Over time, more asphaltene adsorbs onto the adsorbed asphaltene. Another possible theory is that the particles with asphaltene adsorbed thereto create a structure too big to move through the pore space of the rock and therefore becomes trapped. As such, regardless of theory, because of the iron oxide, the asphaltene is retained in the formation, to upgrade the hydrocarbons within the reservoir.

Figure 3D:
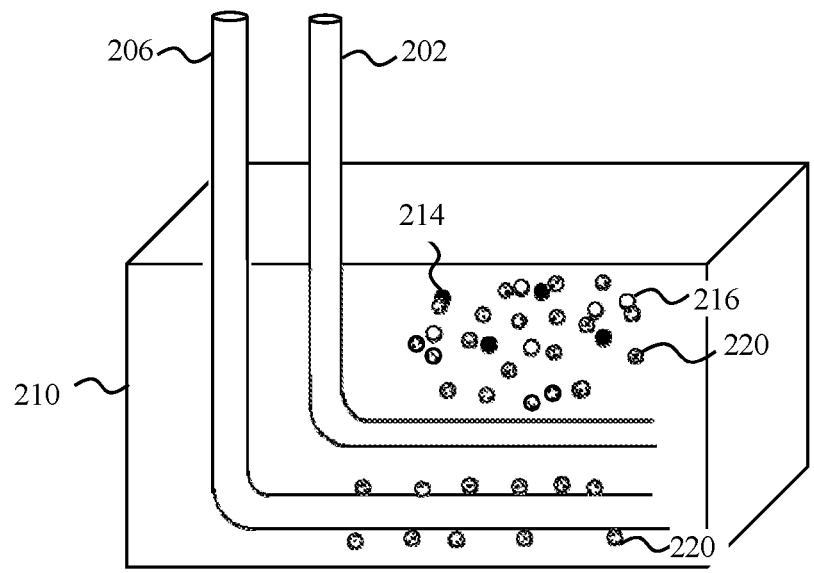

Therefore, for the purposes of illustration, in FIG. 1, at step 104, the asphaltene-sorbent particles that were injected into the subterranean reservoir in step 102, are allowed residence time in the formation so there is time to capture the asphaltene, whether or not the particles attach to the rock. In other words, the injection of iron oxide particles is allowed to soak in the formation. This step may be performed with or without active intervention to overall allow for contact time between the injected mixture and the reservoir. Relatively quiescent conditions may facilitate the binding of the particles in the subterranean reservoir. For example, injection of the steam may be ceased to leave the asphaltene-sorbent particles in the subterranean reservoir for a period of time relatively undisturbed. The asphaltene-sorbent particles may adhere to rock, such as sand particles, in the subterranean reservoir. Alternatively or in addition, larger size clots may form that cannot move through the rock. Either way, allowing the mixture to soak, relatively undisturbed in the reservoir facilitates the capturing of asphaltenes. FIG. 3D is a schematic depiction of step 104, showing the asphaltene-sorbent particles 220 attached to sand particles of the subterranean reservoir 210 after cessation of steam injection.

It is not an outright requirement to cease steam injection. However, cessation of steam injection may speed up the process of the asphaltene-sorbent particles contacting hydrocarbons in-situ and adsorbing asphaltenes from the hydrocarbons. Steam injection does not need to be ceased forever in this case, just stopped for a period of time.

Figure 3E:
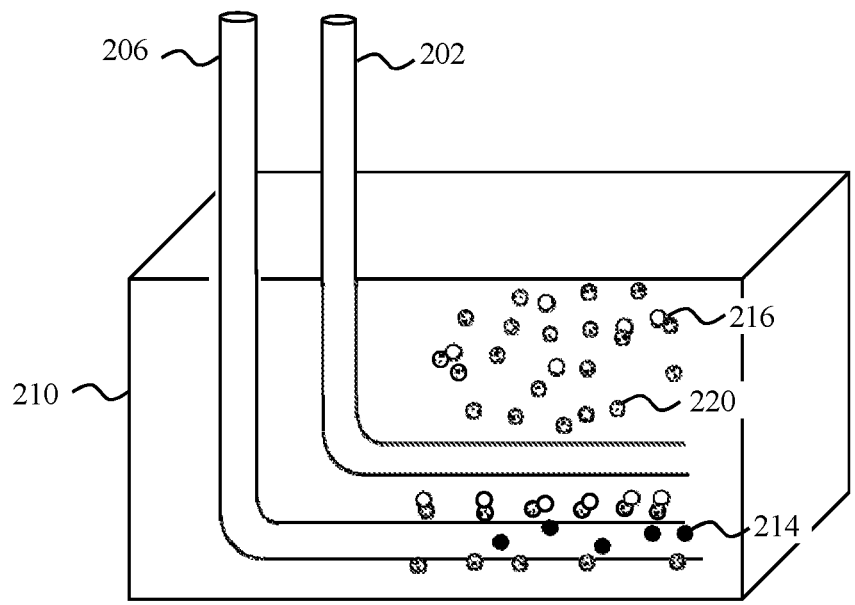

In FIG. 1, at step 106, the hydrocarbons are allowed to produce, for example drain by gravity, into the production tubing string, while the asphaltene-sorbent particles with adsorbed asphaltene remain retained in, for example attached to, the subterranean reservoir. FIG. 3E is a schematic depiction of this step showing upgraded hydrocarbon molecules 214 within the production tubing 206 while the asphaltene-sorbent particles 220 with adsorbed asphaltene molecules 216 remain in the region of the steam chamber. The hydrocarbon molecules 214 are upgraded, since they contain less asphaltene than what would be produced without the addition of the asphaltene-sorbent particles.

Figure 3F:
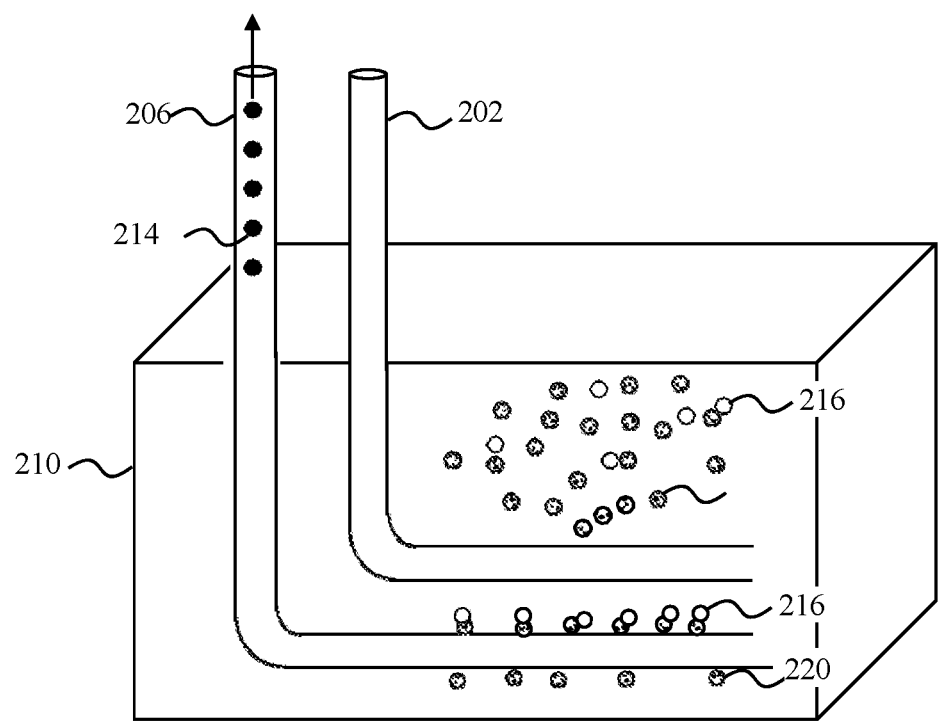

In FIG. 1, at step 108, the upgraded hydrocarbons are produced to the surface via the production tubing. FIG. 3F is a schematic depiction of this step showing the upgraded hydrocarbon molecules 214 flowing to the surface via the production tubing 206.

While good results have been found with the method of steps 100 to 104, in some circumstances injecting higher concentrations of iron oxide may not in fact lead to better results regarding in situ deasphalting. In some cases, injection of higher concentrations of asphaltene-sorbent particles hinders oil recovery as compared to injection with lower concentration of iron oxides. In other cases, a single injection does not lead to much improved API and viscosity over time. In one embodiment, the method includes repeating 105 steps 102 and 104 one or more times. In particular, after step 104, the method further includes injecting a further amount of asphaltene-sorbent particles and waiting a further amount of time for the particles to act. In this embodiment, it has been found that good results are achieved even where small quantities of asphaltene-sorbent particles are added over the repeated injection steps within a short period of time. While the amount injected in the first and following injections can vary between the above-noted 10 to 400 ppm, if it is determined that production is hindered or asphaltene levels are not adequately or consistently reduced, smaller amounts of adsorbent can be injected in each step. For example, rather than injecting 300-400 ppm in one injection, a plurality of injections can be employed that in total add up larger amounts such as 300-400 ppm. In one embodiment, the first injection introduces enough iron oxide to bring the concentration in the carrier fluid to 10-400 ppm and more likely about 50-200 ppm. Then, the next injection introduces a further amount of 10-400 ppm and more likely about 50-200 ppm. Again, it is noted that these concentrations are measured in the volume of carrier fluid, including steam, injected. There may be one or more further injections.

In one embodiment, the further injection step can be spaced 30 minutes to 48 hours after the first injection. In a more particular embodiment, the further injection of iron oxide can be spaced 1 hour to 12 hours after the prior injection.

The repeat injections 105 can be iron oxide in a mixture with carrier fluid or with steam. If the injection is not made with steam, steam may be injected before or after the further one or more injections.

The final soaking period 106 can be the same time, shorter or longer than earlier soak times. Longer soak times are more beneficial in terms of the degree to which asphaltene is adsorbed in the reservoir. However, it is a cost benefit analysis. Generally, the soak time after the final injection will be hours to days, such as 24 to 72 hours.

The formation can be produced, as in step 108, after each soaking period 104 or the one or more further injections can be made before the well is allowed to produce to surface, step 108. In one embodiment, the multiple steps 105 of injecting asphaltene-sorbent particles 102 and providing for soaking time 104 are conducted prior to producing the hydrocarbons to surface 108.

Referring back to FIG. 1, the method may also include an optional step 110 that is applicable to steam injection operations, such as SAGD or steam flooding that use two wells, where one of the wells is an injection well for injection of steam, and the other well is a production well for production of hydrocarbons to the surface. At step 110, a mixture of a carrier fluid and additional asphaltene-sorbent particles are injected via the production tubing string 206 of the production well 204 into the subterranean reservoir. That is, the production tubing string 206 is used in a non-conventional manner to convey material from the surface into the subterranean reservoir. FIG. 3B is a schematic depiction of step 110, showing the carrier fluid 222 mixed with additional asphaltene-sorbent particles 220 being pumped into the subterranean reservoir. In embodiments, the carrier fluid 222 may be a liquid such as water, hydrocarbon or ethyl acetate. In embodiments, the carrier fluid 222 may be a gas, such as a steam, nitrogen or methane. The carrier fluid may be transported to the well head of the production well such as by truck or other means. In like manner as the asphaltene-sorbent particles that are injected at step 102, the additional asphaltene-sorbent particles that are injected in step 110 will reduce or prevent asphaltene from being produced and cause the asphaltene contacted by the carrier fluid/particle mixture to be retained in the subterranean reservoir. This operation will be near wellbore, in the path where produced hydrocarbons will pass. FIG. 1, and the sequence of FIGS. 3A to 3F, show step 110 as being performed prior to steps 100 to 108. However, it will be understood that step 110 may be performed periodically, and in other orders relative to these steps, but preferably in such an order that does not interfere with migration of hydrocarbons to the production well, and production of hydrocarbons to the surface via the production well. Further, by use of flow control devices associated with the production well, the carrier fluid and additional asphaltene-sorbent particles may be injected into those portions of the subterranean reservoir surrounding the production well where hydrocarbons are most likely to be produced. Such locations may be predicted by persons skilled in the art, and/or determined empirically when the well system is in operation.

As known to persons skilled in the art, SAGD and other steam injection operations as described below may be conducted over many years for a particular subterranean reservoir. For SAGD, the steam injection is substantially continuous over a number of years. With other types of steam injection operations such as CSS, there may be multiple cycles of a steam injection phase followed by a hydrocarbon production phase. Regardless, steps 102 to 108 may be performed multiple times over the life of the well in cycles, with each performance of step 108 corresponding to a hydrocarbon production period after the injection of iron oxide. For example, the method could be repeated every few months, on a yearly basis or when analysis shows that asphaltene concentrations are increasing in the produced hydrocarbons.

From cycle to cycle, the amount or concentration of asphaltene-sorbent particles in the mixture that is injected into the subterranean reservoir at each cycle may be selectively varied, possibly to account for factors such as the amount or concentration of asphaltene-sorbent particles that have been previously injected in past cycles, or will be injected in subsequent cycles. This can be used to achieve a variety of advantageous effects. As one example, the concentration or amount of asphaltene-sorbent particles that is injected in any given cycle can be limited, with a view to incrementally increasing the concentration or amount of asphaltene-sorbent particles attached to the subterranean reservoir over multiple cycles. As another example, the concentration or amount of asphaltene-sorbent particles that is injected in any given cycle can be selected to control the distribution of asphaltene-sorbent particles in the subterranean reservoir. For instance, the volumetric portion of the subterranean reservoir that is "seeded" with the asphaltene-sorbent particles can be incrementally increased over multiple cycles. As still another example, the concentration or amount of asphaltene-sorbent particles in the mixture that is injected in any given cycle can be varied over cycles to account for varying levels of asphaltene concentration in produced fluids during the operation of the well, or to selectively vary the asphaltene concentration of fluids produced to the surface during the operation of the well.

Controlled Placement of Asphaltene-Sorbent Particles.

The contact time between the hydrocarbons and the asphaltene-sorbent particles in the subterranean reservoir may be quite brief due to flow of steam through the formation. As such, creating regions of the subterranean reservoir that have higher concentrations of steam containing asphaltene-sorbent particles, and controlling the flow of the steam/particulate mixture through such regions may promote contact of the asphaltene-sorbent particles with the hydrocarbons and the asphaltene therein, and therefore make the most economical and effective use of the asphaltene-sorbent particles.

As a non-limiting example, referring back to the FIG. 2, the injection tubing 202 may include a plurality of steam flow control devices, including a first steam flow control device 224 and a second steam flow control device 226, disposed at different positions along the subterranean reservoir. "Steam flow control device", as used herein, refers to any mechanical device that can be incorporated into a downhole string, and that acts to selectively control flow of steam out of the downhole tubing and into the surrounding wellbore. Steam flow control devices are known to persons skilled in the art. Steam flow control devices may be referred to in the art as "steam splitters", "steam diverter", "steam valves", "steam injection mandrels", and like terms. As a non-limiting example, a steam flow control device may comprise a body defining a bore, and a valve member that is passively operable or actuable to control steam flow out of the reservoir.

By the steam flow control devices (and the use of possible sealing elements associated with the injection tubing 202, such as sealing elements used for zonal isolation), it is possible to establish pressure gradients in the subterranean reservoir. These pressure gradients will affect the distribution of asphaltene-sorbent particles 220, as the injected steam and asphaltene-sorbent particles 220 will tend to migrate from regions of higher pressure to regions of lower pressure. In FIG. 2, for example, closing of the first steam flow control device 224 and opening of the second steam flow control device 226 may create a region of relatively lower pressure in the vicinity of the first steam flow control device 224, and a region of relatively higher pressure in the vicinity of the second steam flow control device 226. Accordingly, asphaltene-sorbent particles 220 injected into the subterranean formation via the second steam flow control device 226 may tend to flow from right to left in the drawing plane of FIG. 2. This may result in a region having a higher concentration of asphaltene-sorbent particles 220 near the second steam flow control device 226, as compared with the region near the first steam flow control device 224. (The asphaltene-sorbent particles 220 would be expected to become more diffuse in concentration with increased distance from their injection location at the second steam flow control device 226.)

Steam in the steam chamber 212 flows from regions of relatively high pressure to regions of relatively low pressure. Accordingly, the steam flow control devices or other means may also be selectively controlled to establish a pressure gradient that affects the flow of steam in the steam chamber 212 to regions of the steam chamber 212 having relatively higher concentrations of asphaltene-sorbent particles 220. For example, after the asphaltene-sorbent particles 220 are allowed to attach to the sand particles of the subterranean reservoir, injection of steam (without further injection asphaltene-sorbent particles 220) into the steam chamber 212 may be continued. Opening of the first steam flow control device 224 and closing of the second steam flow control device 226 may create a region of relatively higher pressure in the vicinity of the first steam flow control device 224, as compared with the region in the vicinity of the second steam flow control device 226. Accordingly, steam will tend to flow from left to right in the drawing plane of FIG. 2, so as to flow through the region of the steam chamber 212 in the vicinity of the second steam flow control device 226 having the relatively higher concentration of asphaltene-sorbent particles 220, preferentially over other regions having relatively lower concentrations of asphaltene-sorbent particles 220.

Adaption to Other Well Systems and Steam Injection Operations.

In the embodiment of FIGS. 3A to 3F, the method is implemented using a SAGD well system. In other embodiments, the method may be implemented for other in situ hydrocarbon production operations employing steam injection, including cyclic steam stimulation (CSS), steam flooding or steam drive.

As known in the art, cyclic steam stimulation typically involves a "steam phase" of injecting steam into the reservoir via the well and a "production phase" of producing hydrocarbons to the surface from the same well. The method of the present invention may be implemented by: (i) injecting steam and asphaltene-sorbent particles into the subterranean reservoir via the well during the "steam phase". This may include injecting a mixture of steam and particles, mixed at surface or sequential injections of steam and then particles in various orders. The particles may be in a carrier fluid. Then, (ii) allowing a "soak phase" where the particles adsorb asphaltene in the subterranean reservoir. Then, (iii) a further amount of asphaltene-sorbent particles is injected either in steam or in a carrier fluid. Eventually, (iv) the hydrocarbons are produced to the surface via the same well during the "production phase", without producing the asphaltene-sorbent particles with adsorbed asphaltene that remain attached to the subterranean reservoir. Thus, it will be understood that the method may be implemented using a single well system, which may be a vertical well.

As known in the art, steam flooding or steam drive typically involves injecting steam into a reservoir via a first well to reduce the viscosity of hydrocarbons and displace the hydrocarbons toward a different second well. In contrast to SAGD, the first well and the second well may both be vertical wells that are horizontally spaced apart from each other. The method of the present invention may be implemented by: injecting a mixture of steam and asphaltene-sorbent particles into the subterranean reservoir via the first well; allowing asphaltene-sorbent particles to attach to the subterranean reservoir that is disposed horizontally between the first and second wells, and adsorb asphaltene in that subterranean reservoir; and producing the hydrocarbons to the surface via the second well, without producing the asphaltene-sorbent particles with adsorbed asphaltene. Those particles are retained in the subterranean reservoir. Thus, it will be understood that the method may be implemented using cyclic steam stimulation (CSS), steam flooding or steam drive as an alternative to SAGD.

Other Applications of In Situ Upgrading

Iron oxide injection may be useful in a system where already produced oil is re-injected into a reservoir and upgraded before being re-produced. In particular, a reservoir, such as a spent reservoir can be seeded with iron oxide particles, the particles as described above. Then, in order to upgrade oil that has already been produced, that oil can be introduced into the seeded formation. Then, the oil can be produced to surface again. This will ensure that the upgrading occurs underground, which means the waste asphaltene remains underground. This approach may also allow for heat recovery from spent reservoirs.

EXAMPLES

SAGD Displacement Experiment

Figure 4:
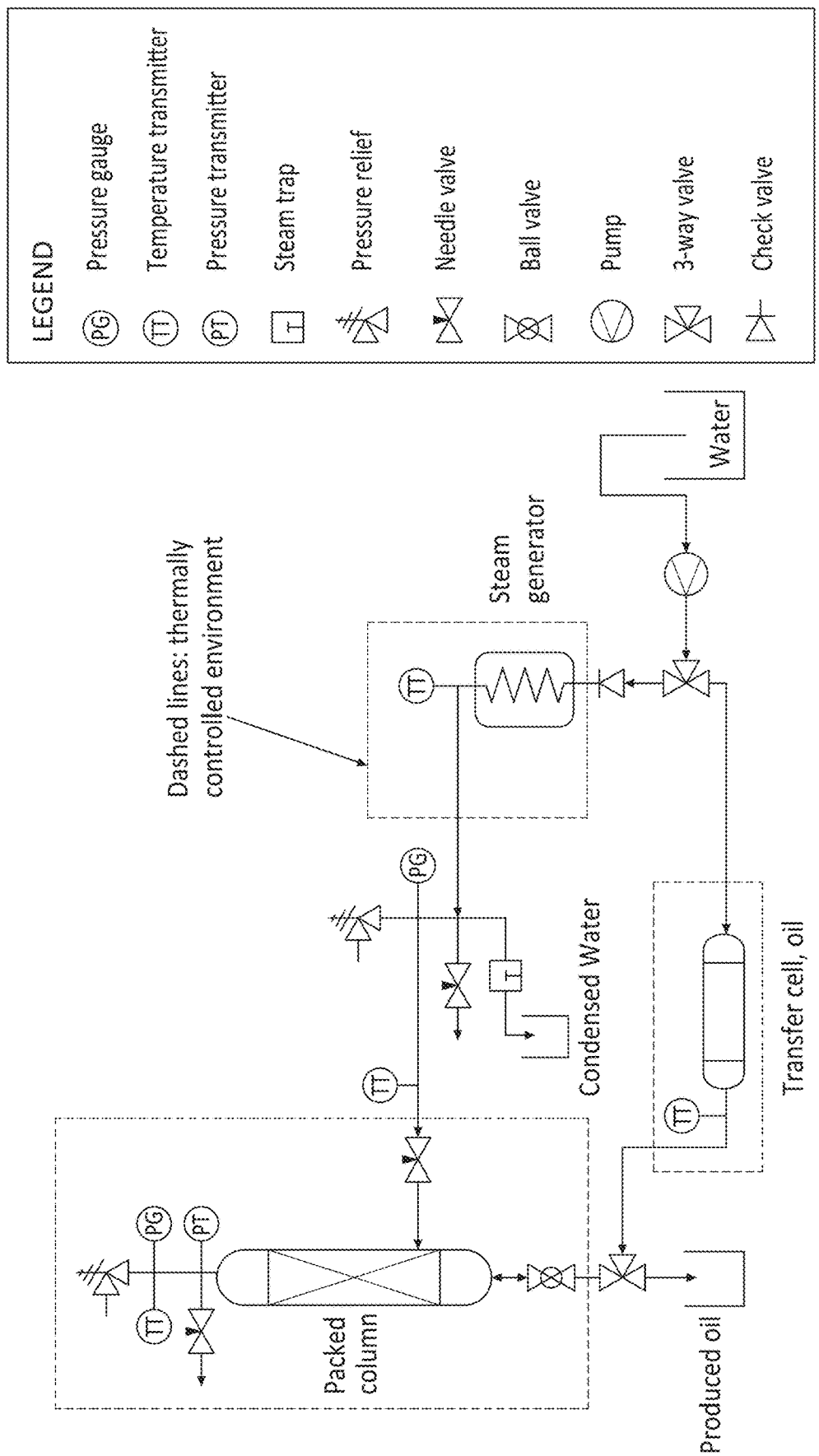
FIG. 4 is a schematic representation of the 1-D sand bed SAGD setup for the experiments.

A model SAGD set up was designed as shown in FIG. 4.

The dimensions of the sand pack column were 2.21 cm (D) by 22.42 cm (L). Sandstone sand was washed and sieved to mesh size 80 then packed to the column. To minimize heat loses, the model was wrapped with heating tapes and aluminum foil then distributed with thermocouples to capture the temperature of the entire model. Heavy oil in the transfer cell was heated up to 100° C. to make it movable and it was saturated to the model using the Isco pump. The heavy oil was from applicant's resources.

After saturation with heavy oil, the reactor was set for steam injection up to 230° C. with and without iron oxide asphaltene-sorbent nanoparticles in the coil, as per below. Steam was injected at a rate of 3.5 mL/min cold water equivalent (CWE).

Iron oxide powder was employed where each powder particle has a maximum dimension of 100 nm. Iron oxide nanofluids were formulated using the iron oxide powder in deionized water. The below noted concentrations of nanoparticles were calculated based on the mass of nanoparticles in the nanofluid over the mass of total steam injected.

The produced oil/water emulsion was separated by gravity and the heavy oil samples have been analyzed as noted below.

The effect of nanofluid cycle injection was evaluated by injecting a pulse of 10 mL of the iron oxide nanofluid during each 1 hour period of steam injection for a total of 2 h. Samples were taken (i) at the end of the first hour, before the second injection and (ii) after the second injection, at the end of hour 2. The two samples were tested for asphaltene content.

The first injection cycle injected a total volume of steam equaling 5.3 PV in the first hour. 1 PV is equivalent to 33.8 mL of steam and, as such, the total volume of steam injected at the end of the first 1 hour cycle was equivalent to 179.14 mL.

An amount of nanofluid was injected during the first cycle resulting in a concentration of 132 ppm of iron oxide introduced, at the end of the first hour. This concentration was computed based on the known amount of iron oxide in the nanofluid and the mass of steam injected in the system. At the end of the first hour, a first sample of oil was obtained from the sand pack column.

Thereafter, steam injection was continued and a further 10 mL of the iron oxide nanofluid was injected. In the second hour, a further volume of steam equaling 5.3 PV was injected. As such, in the second hour, a further 179.14 mL was injected for a total of 358.28 mL over the entire 2 hours. Considering the overall volume of steam injected, the second injection was calculated to result in a further amount of 66 ppm iron oxide. At the end of the two hour period, a second sample of oil was collected.

For control comparisons, a similar experiment was run with steam injection and but without iron oxide injections. Two samples were taken, the first after 1 hour of steam injection and the second sample after the second hour of steam injection.

The samples were analyzed for residual content of C-5 asphaltenes, according to ASTM standards (L. Carbognani et al. *Petroleum Science and technology*, 2010, 28, 632-635). The results are shown in Table 1.

TABLE 1

Results of a two-cycle injection - residual content of C5 asphaltenes in produced oil

| Sample | After 1 hour residual content | After 2 hours residual content |
| --- | --- | --- |
| No iron oxide | 18.2% | 17.2% |
| Iron oxide injected | 14% | 10% |

The American Petroleum Institute gravity, or API gravity, is a measure of how heavy or light a petroleum liquid is compared to water: if its API gravity is greater than 10, it is lighter and floats on water; if less than 10, it is heavier and sinks in water. The formula to calculate API is well known. The API was calculated for the samples taken after iron oxide injection and for the original feed, as shown in Table 2.

TABLE 2

API results of a two-cycle injection compared against the feed heavy oil

| Sample | Mass (g) | Vol (mL) | Temp (° C.) | Density | SG | API |
| --- | --- | --- | --- | --- | --- | --- |
| Feed | 0.978 | 1 | 60 | 0.978 | 0.995 | 10.778 |
| Iron oxide Hour 1 | 0.9652 | 1 | 70 | 0.965 | 0.988 | 11.772 |
| Iron oxide Hour 2 | 0.9652 | 1 | 60 | 0.863 | 0.877 | 19.813 |

It was already established that with one time injections, even the use of increasing nanoparticle concentration had no significant beneficial effect on asphaltene reduction in the produced fluids. The results for a two injection cycle evidenced a noticeable asphaltene reduction in the produced fluid after the second injection.

It is believed that the injection of additional nanofluid a short time after a first injection cycle, provides more nanoparticles to interact again with the oil in the system and more in-situ adsorption of the residual may take place that results in an additional oil upgrade.

Interpretation.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The claimed invention is:

1. A method for producing hydrocarbons from a subterranean reservoir, the method comprising the steps of:
    (a) injecting a first amount of iron oxide particles as an asphaltene-sorbent into the subterranean reservoir;
    (b) allowing time for at least some of the iron oxide particles to adsorb asphaltenes from the hydrocarbons;
    (c) injecting a second amount of iron oxide particles as an asphaltene-sorbent into the subterranean reservoir, wherein steps (a) to (c) result in asphaltenes being adsorbed to the iron oxide particles in the subterranean reservoir and thereby generating upgraded hydrocarbons within the subterranean reservoir; and
    (d) producing the upgraded hydrocarbons.

2. The method of claim 1, wherein the iron oxide particles are nanoparticles.

3. The method of claim 1, wherein allowing time separates steps (a) and (c) by 30 minutes to 48 hours.

4. The method of claim 3, wherein allowing time separates steps (a) and (c) by 1 hour to 12 hours.

5. The method of claim 1, further comprising injecting a fluid for enhancing the production of the upgraded hydrocarbons.

6. The method of claim 5 wherein the fluid is one or more of steam, water and solvents.

7. The method of claim 5 wherein step (a) occurs at the same time as injecting the fluid, such that the fluid and the iron oxide asphaltene-sorbent are injected as a mixture.

8. The method of claim 5, wherein step (a) occurs before or after injecting the fluid.

9. The method of claim 1, wherein steps (a) and (c) inject the iron oxide asphaltene-sorbent in a carrier fluid.

10. The method of claim 9, wherein the carrier fluid is steam, ethyl acetate, water, hydrocarbon, nitrogen and/or methane.

11. The method of claim 1, wherein injecting an iron oxide asphaltene-sorbent includes operating flow control devices to select for different parts of the well and different times of injection.

12. The method of claim 1, wherein step (a) injects the iron oxide asphaltene-sorbent at a concentration of between 10 ppm and 400 ppm in a carrier fluid.

13. The method of claim 12, wherein step (a) injects the iron oxide asphaltene-sorbent at a concentration of less than or equal to 150 ppm in a carrier fluid.

14. The method of claim 1 wherein the first amount of the iron oxide asphaltene-sorbent is the same quantity as the second amount.

15. The method of claim 1, wherein step (a) is focused in a near wellbore region of a well.

16. The method claim 1, wherein the method is a part of any one or more of the following operations: steam assisted gravity drainage (SAGD), steam flooding, water flooding, steam drive, cyclic steam stimulation (CSS), solvent aided processes (SAP), solvent-dominant processes (SDP), cold heavy oil production with sand (CHOPS) and $CO_2$ flood.

17. The method of claim 1, wherein step (a) is conducted through a production well adjacent to an injection well.

18. The method of claim 1, where the subterranean reservoir has a temperature of 200 to 300° C.

19. The method of claim 1, where the subterranean reservoir has a pressure of 500 kPa to 9 MPa.

20. The method of claim 1, further comprising injecting a further amount of iron oxide particles into the subterranean reservoir 30 minutes to 48 hours after step (c).

* * * * *